United States Patent
Sridhara et al.

(10) Patent No.: US 9,203,560 B2
(45) Date of Patent: Dec. 1, 2015

(54) METHODS AND APPARATUS FOR DELAYED BLOCK ACKNOWLEDGEMENT IN A WIRELESS LOCAL AREA NETWORK (WLAN)

(75) Inventors: Vinay Sridhara, Santa Clara, CA (US); Sanjiv Nanda, Ramona, CA (US); Srinivas Kandala, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 664 days.

(21) Appl. No.: 12/277,770

(22) Filed: Nov. 25, 2008

(65) Prior Publication Data

US 2009/0252143 A1    Oct. 8, 2009

Related U.S. Application Data

(60) Provisional application No. 61/042,390, filed on Apr. 4, 2008, provisional application No. 61/090,394, filed on Aug. 20, 2008.

(51) Int. Cl.
*H04J 3/00* (2006.01)
*H04L 1/16* (2006.01)
*H04L 1/18* (2006.01)
*H04L 1/00* (2006.01)

(52) U.S. Cl.
CPC ............ *H04L 1/1685* (2013.01); *H04L 1/1854* (2013.01); *H04L 1/1887* (2013.01); *H04L 1/1635* (2013.01); *H04L 2001/0093* (2013.01)

(58) Field of Classification Search
None
See application file for complete search history.

(56) References Cited

U.S. PATENT DOCUMENTS

| 5,528,605 | A | * | 6/1996 | Ywoskus et al. ............ 714/749 |
| 5,754,754 | A | * | 5/1998 | Dudley et al. .................. 714/18 |
| 7,120,852 | B2 | | 10/2006 | Terry et al. |
| 7,463,642 | B2 | | 12/2008 | Qian |

(Continued)

FOREIGN PATENT DOCUMENTS

| CN | 1689262 A | 10/2005 |
| CN | 1826762 A | 8/2006 |

(Continued)

OTHER PUBLICATIONS

International Search Report & Written Opinion—PCT/US2009/039427, International Search Authority—European Patent Office—Oct. 15, 2009.

(Continued)

*Primary Examiner* — Kevin C. Harper
*Assistant Examiner* — Thinh Tran
(74) *Attorney, Agent, or Firm* — Dang M. Vo

(57) ABSTRACT

Methods and apparatus for delayed block acknowledgments in a WLAN. In an aspect, a method is provided for communication with one or more nodes. The method includes transmitting to the one or more nodes a block comprising data and a first bit indicating no acknowledgements for the data are to be transmitted from the one or more nodes. The method also includes determining whether a selected time location within a transmit time duration has been reached, wherein if the selected time location has been reached, transmitting to the one or more nodes a second bit indicating that the one or more nodes are to transmit one or more acknowledgements, respectively, for the data. The method also includes receiving at least one acknowledgment for the data within a remaining portion of the transmit time duration.

50 Claims, 6 Drawing Sheets

(56) References Cited

U.S. PATENT DOCUMENTS

| | | | |
|---|---|---|---|
| 7,804,762 | B2 | 9/2010 | Stephens et al. |
| 2004/0156443 | A1 | 8/2004 | Dent |
| 2005/0169232 | A1* | 8/2005 | Sakoda et al. ............... 370/347 |
| 2005/0237992 | A1 | 10/2005 | Mishra et al. |
| 2006/0056443 | A1 | 3/2006 | Tao et al. |
| 2006/0092871 | A1* | 5/2006 | Nishibayashi et al. ....... 370/328 |
| 2007/0058605 | A1 | 3/2007 | Meylan et al. |
| 2007/0115180 | A1 | 5/2007 | Kish et al. |
| 2007/0147284 | A1* | 6/2007 | Sammour et al. ............ 370/328 |
| 2007/0153760 | A1 | 7/2007 | Shapira |
| 2007/0165590 | A1 | 7/2007 | Kneckt et al. |
| 2007/0298742 | A1 | 12/2007 | Ketchum et al. |
| 2008/0002615 | A1 | 1/2008 | Nakajima et al. |
| 2008/0075004 | A1 | 3/2008 | Mishima |
| 2008/0285523 | A1 | 11/2008 | Bjorken |
| 2009/0181687 | A1 | 7/2009 | Tiirola et al. |
| 2009/0203323 | A1 | 8/2009 | Ratasuk et al. |
| 2009/0225700 | A1 | 9/2009 | Shen et al. |
| 2009/0252100 | A1 | 10/2009 | Sridhara et al. |
| 2009/0252110 | A1 | 10/2009 | Sridhara et al. |
| 2010/0189056 | A1 | 7/2010 | Nishibayashi et al. |

FOREIGN PATENT DOCUMENTS

| | | |
|---|---|---|
| CN | 101268660 A | 9/2008 |
| CN | 101292447 A | 10/2008 |
| CN | 101297561 A | 10/2008 |
| DE | 2006014492 | 2/2007 |
| EP | 1589704 A2 | 10/2005 |
| EP | 1641180 A1 | 3/2006 |
| EP | 1777878 A1 | 4/2007 |
| JP | 2005039728 A | 2/2005 |
| JP | 2005252897 A | 9/2005 |
| JP | 2005348388 A | 12/2005 |
| JP | 2006050519 A | 2/2006 |
| JP | 2006129393 A | 5/2006 |
| JP | 2007525092 A | 8/2007 |
| JP | 2009509469 A | 3/2009 |
| WO | 2005004500 A2 | 1/2005 |
| WO | 2006008638 A1 | 1/2006 |
| WO | WO2006091809 | 8/2006 |
| WO | 2006096753 A2 | 9/2006 |
| WO | 2007038118 A2 | 4/2007 |
| WO | 2007046618 A1 | 4/2007 |
| WO | WO-2007087842 A1 | 8/2007 |
| WO | 2008114662 A1 | 9/2008 |

OTHER PUBLICATIONS

Coffey. S., et al., "WWISE IEEE 802.11n Proposal," doc.: IEEE 802.11-04/0935r3, Sep. 2004, pp. 1-60.

Fischer. M., "WWISE MAC Proposal for TGn," doc.: IEEE 802.11-05/0016r2, Jan. 17, 2005, pp. 1-56.

International Preliminary Report on Patentability—PCT/US2010/022611, The International Bureau of WIPO—Geneva, Switzerland, Feb. 25, 2011.

Bureau of WIPO—Geneva, Switzerland, Feb. 25, 2011.

Taiwan Search Report—TW098109744—TIPO—May 25, 2012.

Jang K. et al., "Samsung MAC Proposal Technical Specifications", IEEE, IEEE, Piscataway, NJ, USA, vol. IEEE P802.11 Wireless LANs, Aug. 30, 2004, pp. 1-33, XP040384653.

Kim S et al., "MCCA: A High-Throughput MAC Strategy for Next-Generation WLANs [Medium Access Control Protocols for Wireless Lans]", IEEE Wireless Communications, 20080201 IEEE Service Center, Piscataway, NJ, US, 2008, vol. 15, pp. 32-39, XP011204550, ISSN: 1536-1284.

* cited by examiner

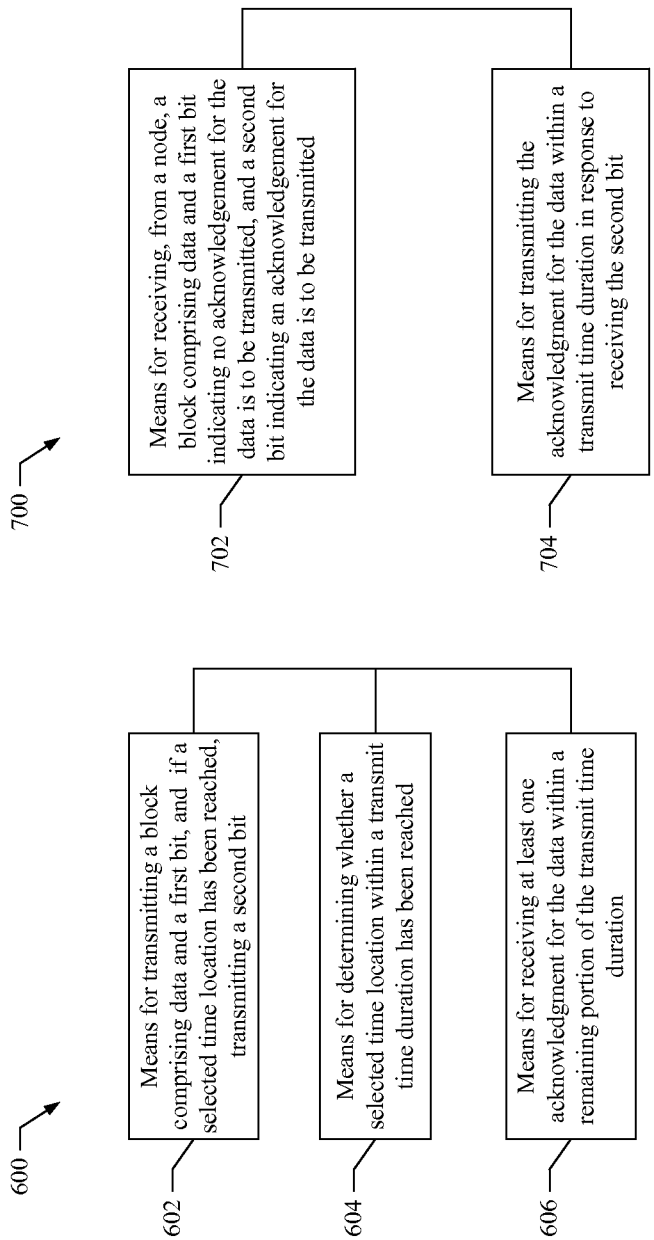

METHODS AND APPARATUS FOR DELAYED BLOCK ACKNOWLEDGEMENT IN A WIRELESS LOCAL AREA NETWORK (WLAN)

CLAIM OF PRIORITY UNDER 35 U.S.C. §119

The present Application for patent claims priority to Provisional Application No. 61/090,394 entitled "METHOD AND APPARATUS FOR DELAYED BLOCK ACKNOWLEDGEMENT IN A WIRELESS LOCAL AREA NETWORK (WLAN)" filed Aug. 20, 2008, and Provisional Application No. 61/042,390 entitled "METHOD AND APPARATUS FOR DELAYED BLOCK ACKNOWLEDGEMENT IN A WIRELESS LOCAL AREA NETWORK (WLAN)" filed Apr. 4, 2008, and assigned to the assignee hereof and hereby expressly incorporated by reference herein.

BACKGROUND

1. Field

The present application relates generally to the operation of wireless communication systems, and more particularly, to methods and apparatus for delayed block acknowledgment in a communication network 2. Background One of the main features of wireless systems like an IEEE 802.11 WLAN is the acknowledgement of successfully received packets. Successfully received packets are those, for example, that did not collide with other transmissions or they have reception power above the receiver sensitivity threshold so that they are able to be properly decoded at the receiver. In an 802.11 system, the MAC layer protocol data unit (MPDU) that comprises upper layer (i.e., IP layer, etc.) data is encompassed in a PLCP (Physical layer convergence procedure) layer protocol data unit (PPDU). The MPDU has a 32-bit CRC error detection mechanism that spans the data as well as the MAC header. Upon error free reception (no error in the CRC frame check), an acknowledgement (ACK) is sent by the receiver to the transmitter. The ACK is sent by the receiver after a Short Interframe Space (SIFS) time so that there is enough time to decode the packet to check if the frame was intended for the decoding station, and to check for the presence of errors by computing the Cyclic Redundancy Check (CRC).

IEEE 802.11e/n introduces the concept of Block ACK (BA) where a receiving station acknowledges reception of multiple frames by transmitting a single acknowledgement frame with a bitmap of the successfully received MPDUs. ACKs can increase the Quality of Service (QoS) for users in the WLAN. However, in return, ACKs may increase signaling overhead and lower the overall system efficiency. With the increasing popularity of wireless networks, there is an ever greater need to increase the throughput from the existing bandwidth allocations to increase system efficiency. Due to the bandwidth limitations, the efficiency of these networks needs to be enhanced to provide higher throughputs.

Therefore, there is a need in the art to provide solutions to the above identified problems. The various aspects disclosed herein are directed to methods and apparatus for increasing the efficiency of a WLAN that utilizes acknowledgements.

SUMMARY

In various aspects, a delayed block acknowledgement system comprising methods and apparatus is provided that operates to increase the efficiency of a WLAN. In an aspect, the system provides an enhanced acknowledgement mechanism to increase the efficiency at which data transmitted over a common channel to a plurality of devices is acknowledged over a reverse link.

In an aspect, a method is provided for communication with one or more nodes. The method comprises transmitting to the one or more nodes a block comprising data and a first bit indicating no acknowledgements for the data are to be transmitted from the one or more nodes. The method also comprises determining whether a selected time location within a transmit time duration has been reached, transmitting to the one or more nodes a second bit, if the selected time location has been reached, wherein the second bit indicates that the one or more nodes are to transmit one or more acknowledgements, respectively, for the data, and receiving at least one acknowledgment for the data within a remaining portion of the transmit time duration.

In an aspect, an apparatus is provided for communication with one or more nodes. The apparatus comprises a transmitter configured to transmit to the one or more nodes, a block comprising data and a first bit indicating no acknowledgements for the data are to be transmitted from the one or more nodes. The apparatus also comprises a controller configured to determine whether a selected time location within a transmit time duration has been reached. The transmitter is further configured to transmit to the one or more nodes a second bit, if the selected time location has been reached, wherein the second bit indicates that the one or more nodes are to transmit one or more acknowledgements, respectively, for the data. The apparatus also comprises a receiver configured to receive at least one acknowledgment for the data within a remaining portion of the transmit time duration.

In an aspect, an apparatus is provided for communication with one or more nodes. The apparatus comprises means for transmitting to the one or more nodes a block comprising data and a first bit indicating no acknowledgements for the data are to be transmitted from the one or more nodes, and if a selected time location within a transmit time duration is reached, a second bit indicating that the one or more nodes are to transmit one or more acknowledgements, respectively, for the data. The apparatus also comprises means for determining whether the selected time location within the transmit time duration has been reached and means for receiving at least one acknowledgment for the data within a remaining portion of the transmit time duration.

In an aspect, a method is provided for communication. The method comprises receiving, from a node, a block comprising data and a first bit indicating no acknowledgement for the data is to be transmitted, and receiving a second bit indicating an acknowledgement for the data is to be transmitted. The method also comprises transmitting the acknowledgment for the data within a transmit time duration in response to receiving the second bit.

In an aspect, an apparatus is provided for communication. The apparatus comprises a receiver configured to receive, from a node, a block comprising data and a first bit indicating no acknowledgement for the data is to be transmitted, and to receive a second bit indicating an acknowledgement for the data is to be transmitted. The apparatus also comprises a transmitter configured to transmit the acknowledgment for the data within a transmit time duration in response to receiving the second bit.

In an aspect, an apparatus is provided for communication. The apparatus comprises means for receiving, from a node, a block comprising data and a first bit indicating no acknowledgement for the data is to be transmitted. The apparatus also comprises means for receiving a second bit indicating an acknowledgement for the data is to be transmitted, and means for transmitting the acknowledgment for the data within a transmit time duration in response to receiving the second bit.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following Description when taken in conjunction with the accompanying drawings wherein:

FIG. 6 shows an exemplary apparatus for communication with one or more nodes for use in aspects of a delayed block acknowledgment system; and FIG. 7 shows an exemplary apparatus for communication for use in aspects of a delayed block acknowledgment system.

DESCRIPTION

Figure 1:
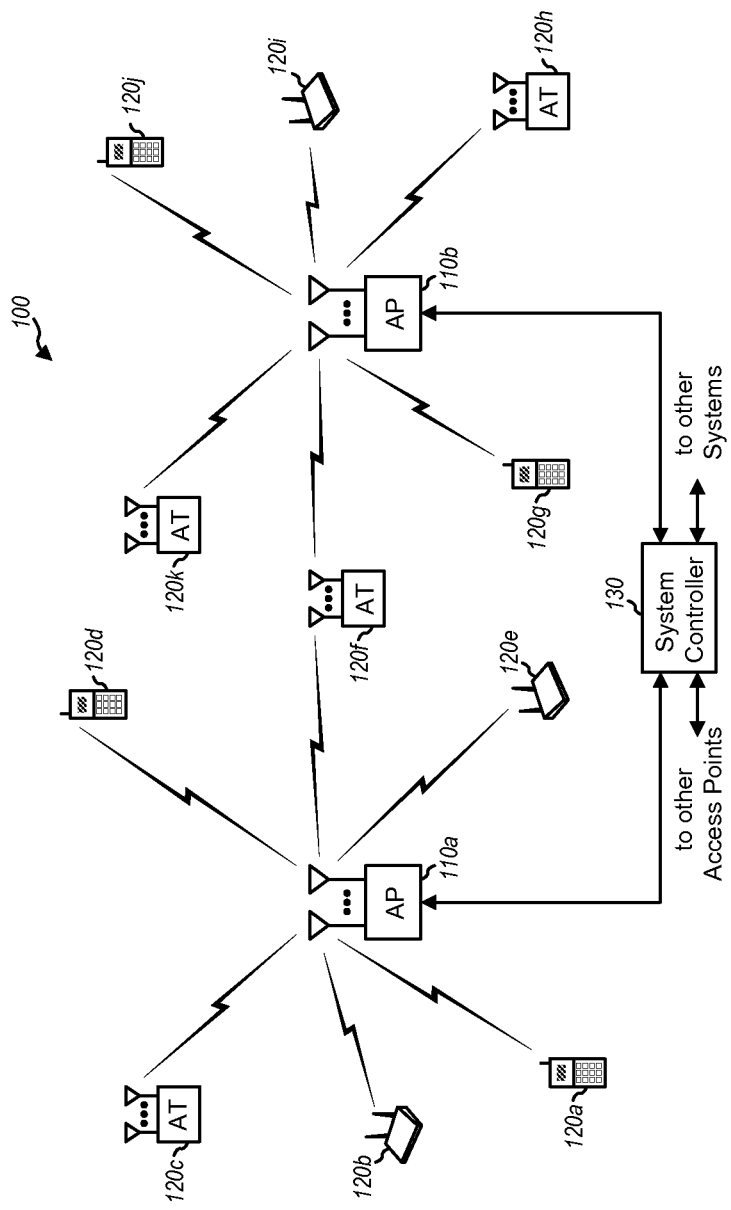
FIG. 1 shows a MIMO WLAN system that supports a number of users and is capable of implementing various aspects of a delayed block acknowledgment system.

Various aspects of the invention are described below. It should be apparent that the teachings herein may be embodied in a wide variety of forms and that any specific structure, function, or both being disclosed herein are merely representative. Based on the teachings herein one skilled in the art should appreciate that any aspect of the invention disclosed herein may be implemented independently of any other aspects and that multiple aspects of the invention may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. An aspect may comprise one or more elements of a claim.

One method of increasing the efficiency of a WLAN is to utilize Reverse Direction Grant (RDG). RDG is a mechanism, for example, as defined in IEEE 802.11n D6.0 to transfer data in both directions without initiating a new transfer procedure. A station transmits a frame to another station indicating that the receiving station can send back data if its buffers indicates it to do so. This mechanism efficiently makes use of a Transmission Opportunity (TxOP), especially when the TxOP holder (initial sender) does not have enough frames to make use of the entire TxOP duration.

Another method to improve the efficiency of a WLAN is to aggregate data packets (AMPDU) at the media access control (MAC) layer to make use of the Block ACK mechanism. Typically two kinds of Block ACK mechanisms are defined under IEEE 802.11n. One method is called an immediate block acknowledgement policy and the other method is called a delayed block acknowledgement policy. As the nomenclature indicates, in the immediate Block ACK policy, the receiver of the AMPDU responds back with a Block ACK immediately after a SIFS duration. In a method using the delayed Block ACK, the receiving stations defer sending a Block ACK until a request, for example, a Block ACK Request (BAR) is sent by the aggregate packet transmitter at a later point in time.

While delayed Block ACK might improve efficiency by allowing multiple AMPDUs to be acknowledged simultaneously, it suffers from other problems such as, increased jitter and delays at the application layer.

In general the type of ACK, if any, exchanged between the transmitting and receiving stations are negotiated prior to the data exchange and notified during communications via a bit indicator or field within the data units transmitted.

Even though the methods of utilizing RDG and BAs, as described above, may increases the efficiency by reducing the number of BA transmissions and also the spacing between the data transmission and the BA transmission, they suffer from increased buffer space. An aggregate packet transmitter has to hold all the MPDUs that are not yet acknowledged by the receiver and hence will not be able to receive further frames from the upper layers till this buffer shrinks. These buffers can be freed only upon reception of ACK for the MPDUs transmitted. It also introduces increased jitter at the application level for certain applications when retransmissions have to be carried out.

FIG. 1 shows a MIMO WLAN system 100 that supports a number of users and is capable of implementing various aspects of a delayed block acknowledgment system. It should be noted that aspects of the delayed block acknowledgment system are suitable for use with a variety of WLAN systems, and that the MIMO WLAN system 100 is described for exemplary purposes. For example, the system is described herein with reference to the transmission and acknowledgment of AMPDUs, but it equally applicable to the transmission of other types of aggregate packets.

The MIMO WLAN system 100 includes a number of access points (APs) 110*a-b* that supports communication for a number of access terminals (ATs) 120*a-k*. For example, in various aspects, an access point may comprise, be implemented as, or known as NodeB, Radio Network Controller (RNC), eNodeB, Base Station Controller (BSC), Base Transceiver Station (BTS), Base Station (BS), Transceiver Function (TF), Radio Router, Radio Transceiver, Basic Service Set (BSS), Extended Service Set (ESS), Radio Base Station (RBS), or some other terminology. Furthermore, in various aspects, a access terminal may comprise, be implemented as, or known as a user terminal (UT), a subscriber station, a subscriber unit, a mobile station, a remote station, a remote terminal, a user agent, a user device, user equipment (UE), or some other terminology. In some implementations an access terminal may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem.

Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium.

For simplicity, only two access points 110a and 110b are shown in FIG. 1. Access terminals 120a-k may be dispersed throughout the system. Each access terminal may be a fixed or mobile terminal that can communicate with the access points 110a and 110b. Each access terminal may communicate with one or possibly multiple access points on the downlink and/or uplink at any given moment. The downlink (i.e., forward link) refers to transmission from the access point to the user terminal, and the uplink (i.e., reverse link) refers to transmission from the access terminal to the access point.

The access point 110a communicates with access terminals 120a through 120f, and the access point 110b communicates with access terminals 120f through 120k. Depending on the specific design of system 100, an access point may communicate with multiple access terminals simultaneously (e.g., via multiple code channels or sub-bands) or sequentially (e.g., via multiple time slots). At any given moment, an access terminal may receive downlink transmissions from one or multiple access points. The downlink transmission from each access point may include overhead data intended to be received by multiple access terminals, user-specific data intended to be received by specific access terminals, other types of data, or any combination thereof. The overhead data may include pilot, page and broadcast messages, system parameters, and so on.

The MIMO WLAN system 100 is based on a network architecture having a centralized controller. Thus, a system controller 130 couples to the access points 110a-b and may further couple to other systems and networks. For example, system controller 130 may couple to a packet data network (PDN), a wired local area network (LAN), a wide area network (WAN), the Internet, a public switched telephone network (PSTN), a cellular communication network, and so on. System controller 130 may be designed to perform a number of functions such as (1) coordination and control for the access points coupled to it, (2) routing of data among these access points, (3) access and control of communication with the access terminals served by these access points, and so on.

During operation of the system 100, the access point 110a communicates with the access terminals 120a-120f. In this example, access point 110a acts as the transmitter station and has packets queued for transmission to the receiving access terminals 120a-120f. For the following description of the various aspects, the access point 110a will be called station A (STA-A) and access terminals 120a-120f will be called stations B through F (STA-B to STA-F), respectively.

Figure 2:
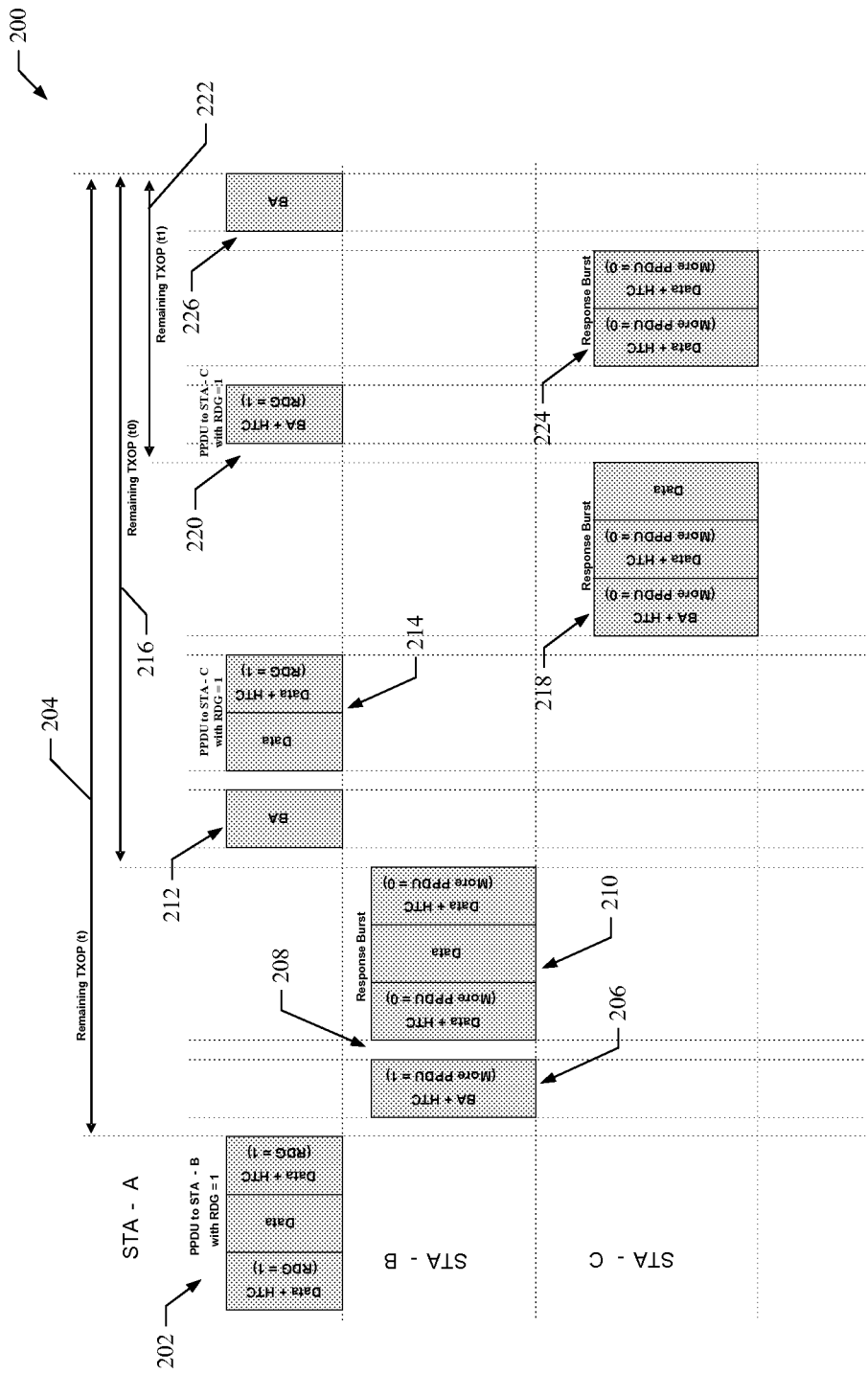
FIG. 2 shows a diagram that illustrates a transmission and reception exchange performed by the WLAN system of FIG. 1 that utilizes a reverse direction grant and block acknowledge.

FIG. 2 shows a diagram 200 illustrating a transmission and reception exchange utilizing a reverse direction grant and block acknowledge. For example, the transmission and reception exchange occurs between the transmitting station STA-A and the receiving stations STA-B through STA-F of the WLAN system shown in FIG. 1.

At reference 202, the STA-A operates as an RD Initiator to transmit a PPDU comprising an AMPDU, which in turn contains MPDUs addressed to STA-B (RD Responder). The ACK policy field of the QoS data AMPDUs is set to implicit Block ACK request. One or more MPDUs within this AMPDU contain an HT control field with the RDG/More PPDU field set to 1, indicating an RDG. The Duration/ID field contains a parameter in microseconds indicating the remaining duration of a TxOP 204.

At reference 206, the STA-B (RD Responder) responds with the transmission of a Block ACK frame in which the RDG/More PPDU field in the HT control field is set to 1, indicating that another PPDU will follow a SIFS or RIFS time duration 208 after the end of the PPDU containing the Block ACK.

At reference 210, the STA-B transmits a PPDU (second PPDU of the response burst) to STA-A, with the ACK policy set to implicit Block ACK request. This PPDU also comprises an AMPDU which contains one or more MPDUs containing an HTC field in which the RDG/More PPDU field is set to 0, indicating that this is the last PPDU of the response burst.

At reference 212, the STA-A (RD Initiator) regains control of the TxOP and transmits a Block ACK MPDU addressed to the STA-B to acknowledge the receipt of the MPDUs transmitted by STA-B in the RD response burst 210.

At reference 214, the STA-A (RD Initiator) transmits a PPDU containing MPDUs addressed to STA-C (new RD Responder). The ACK policy field of the QoS data MPDUs in this PPDU is set to implicit Block ACK request. This PPDU contains one or more HTC MPDUs, in which the RDG/More PPDU field is set to 1, indicating an RDG. The Duration/ID field of the MPDUs in this PPDU contains a parameter (TxOP=t0 us), indicating the remaining time duration of the TxOP as shown at 216.

At reference 218, in response to the received transmission from STA-A, the STA-C (RD Responder) transmits a PPDU to the STA-A containing one more HTC MPDUs in which the RDG/More PPDU field is set to 0, indicating that this is the last PPDU in the response burst. This PPDU contains a Block ACK MPDU that is a response frame to the Implicit Block ACK request of the previous PPDU from STA-A, plus the QoS data MPDUs with the ACK policy field set to implicit Block ACK request.

At reference 220, the STA-A (RD-Initiator) regains control of the TxOP and transmits a Block ACK MPDU acknowledging the MPDUs transmitted by STA-C. This PPDU contains one or more HTC MPDUs with the RDG/More PPDU field set to 1, indicating an RDG. The Duration/ID field of MPDUs in the PPDU contains a parameter (TxOP=t1 us), indicating the remaining time duration of the TxOP as shown at 222.

At reference 224, in response to the transmission from the STA-A, the STA-C (RD-Responder) transmits a PPDU to STA-A containing one or more QoS Data HTC MPDUs with the ACK policy set to implicit Block ACK and the RDG/More PPDU field set to 0. This is the only PPDU in the response burst.

At reference 226, the STA-A (RD-Initiator) transmits a Block ACK to STA-C that acknowledges the MPDUs transmitted by STA-C in the previous RD response burst. Thus, the diagram 200 illustrates a transmission and reception exchange utilizing a reverse direction grant and block acknowledge.

In various aspects, a novel delayed block ACK is used in conjunction with an RDG. The novel delayed block ACK is referred to hereinafter as an RDG Delayed Block ACK. As described in various aspects below, the block ACK is delayed when used with the RDG, however it is delayed by a shorter amount than conventional systems. For example, the Block ACK may be delayed only for the RDG duration. In an aspect, the RD-Initiator may set the ACK policy field to RDG Delayed BA. Thus, when RD Responders detect this and delay all their responses to the MPDUs requiring ACKs until a predetermined time. For example, in an aspect, the RD Responders delay sending their ACKs until the end of the RDG. In another aspect, the RD Responders delay sending their ACKS until a predetermined moment in the data exchange. This predetermined moment can be implicitly or explicitly conveyed to the RD Responders in various ways. For example, the predetermined time could be the end of some sequence time such as a TxOP, or could be a time which is scheduled by the transmitter. In another aspect, upon seeing the RDG field in the VHT control set to 0 (or some other indication), all the RD Responders respond with OFDMA Block ACKs. In another aspect, the novel delayed block ACK mechanism is used in normal TxOP duration appropriately. In still another aspect, a transmitter of the PPDU requests a BA by sending a BAR frame at any stage during the RDG duration.

Thus, various aspects of the delayed block acknowledgement system can be used with a transmitter that has no RDG communication. For example, such a transmitter acquires a TxOP and continues to send a MPDU/AMPDU to an RD Responder without expecting an ACK/BA back until the end of the TxOP time duration. When sending out the last packet in the TxOP duration, the transmitter may make sure that there is enough time for the receiver to send a BA back. Also, while sending out the last MPDU/AMPDU to the receiver, the transmitter may set a bit, indicating that that this is the last packet in the transaction and hence it expects a Block ACK in response. In this example, this provides a delayed Block ACK that does not require an explicit request and also is not delayed infinitely.

Figure 3:
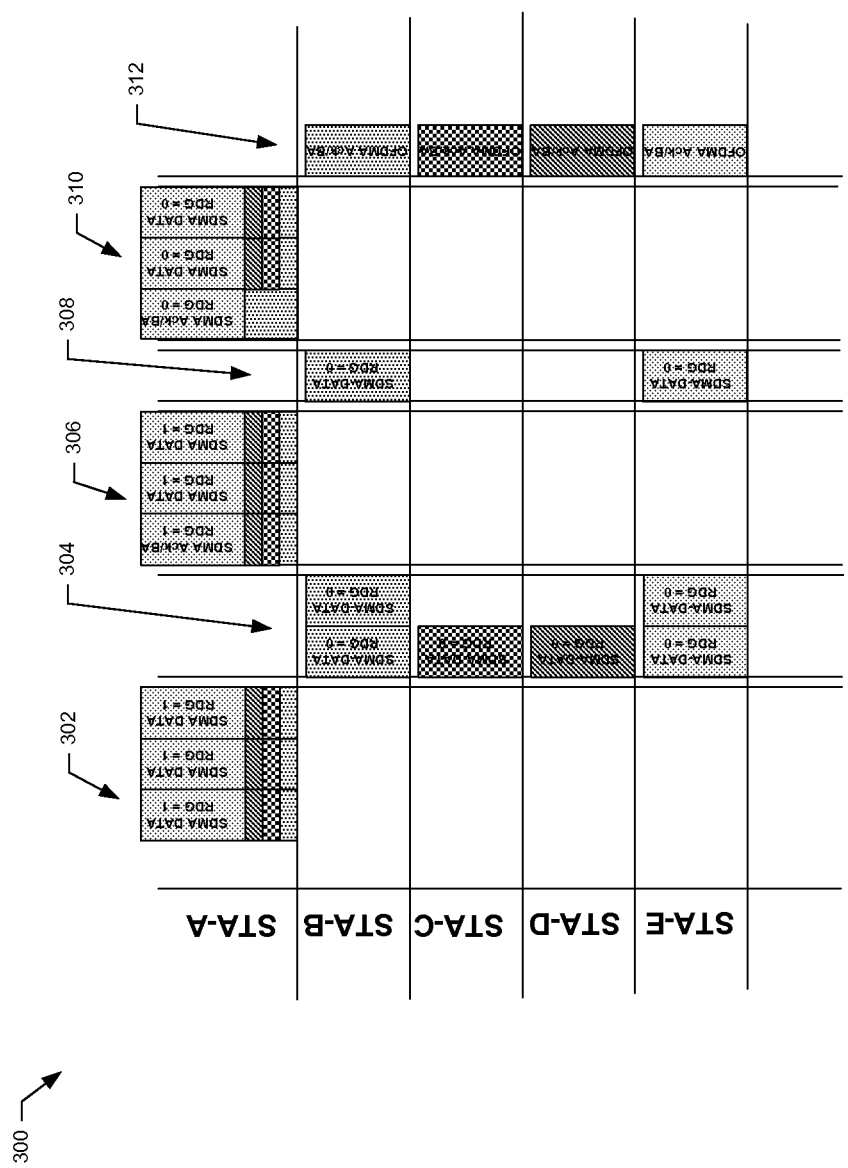
FIG. 3 shows a diagram that illustrates a transmission and reception exchange utilizing a RDG Delayed Block ACK in accordance with aspects of a delayed block acknowledgment system.

FIG. 3 shows a diagram 300 illustrating a transmission and reception exchange utilizing a RDG Delayed Block ACK in accordance with aspects of a delayed block acknowledgement system. For example, the transmission and reception exchange occurs between the transmitting station STA-A and the receiving stations STA-B through STA-E of the WLAN system shown in FIG. 1. With respect to FIG. 3, the RD-Initiator is STA-A and the RD-Responders are the receiving stations STA-B through STA-E. The illustrated transmissions occur using space division multiple access (SDMA) transmission technology.

At reference 302, STA-A (RD Initiator) sends SDMA PPDUs to the stations STA-B, STA-C, STA-D and STA-E (RD Responders). These PPDUs comprise AMPDUs that contain QOS Data for each MPDUs with the ACK policy field set to RDG Delayed Block ACK. One or more of the MSDUs in this PPDU contain VHT control field with the RDG/More PPDU field set to 1, indicating an SDMA RDG. The Duration/ID field contains a parameter indicating the remaining duration of the TxOP.

At reference 304, the RD Responders (STA-B, STA-C, STA-D and STA-E) respond with the SDMA PPDU to STA-A containing one or more VHTC MPDUs in which the RDG/More field is set to 0, indicating that this is the last PPDU in the response burst. This PPDU contains the QOS data MPDUs with the ACK policy field set to implicit Block ACK request.

At reference 306, STA-A (RD Initiator) regains control of the TxOP and sends PPDUs to the stations STA-B, STA-C, STA-D and STA-E (RD Responders). The first (or only) MPDU of these transmissions contain the Block ACK in response to the SDMA Response burst from the RD Responders. One or more of the MSDUs in this PPDU contain VHT control field with the RDG/More PPDU field set to 1, indicating the RDG. The Duration/ID field contains a parameter indicating the remaining time duration of the TxOP.

At reference 308, the RD Responders (STA-B, and STA-E) respond with SDMA PPDUs to STA-A containing one or more VHTC MPDUs in which the RDG/More field is set to 0, indicating that this is the last PPDU in the response burst. At this point, STA-C and STA-D do not have any more QoS data to send and hence they do not transmit. STA-B and STA-E respond with the SDMA PPDU containing QoS data MPDUs with the ACK policy field set to implicit Block ACK request.

At reference 310, STA-A (RD Initiator) regains control of the TxOP and transmits SDMA PPDU to RD Responders (STA-B, STA-C, STA-D, and STA-E). The SDMA PPDU to STA-B and STA-E contain Block ACK MPDU in response to the previous implicit Block ACK request. One or more MPDUs in this PPDU contain the VHT control field with the RDG/More PPDU field set to 0. This indicates the end of RDG in this TxOP. The Duration/ID field of MPDUs in this SDMA PPDU contains a parameter indicating the remaining time duration of the TxOP. Note that when setting the RDG/More PPDU field to 0, the RD-Initiator (STA-A) can also send the tone assignments for the RD-Responders (STA-B, STA-C, STA-D and STA-E) for an OFDMA BA response to be sent out by RD-Responders.

At reference 312, upon seeing the RDG/More PPDU field set to 0, the RD Responders (STA-B, STA-C, STA-D, and STA-E) can make use of the tone assignment information and transmit an OFDMA Block ACK to STA-A that acknowledges the MPDUs transmitted by STA-A during this RDG sequence.

For the purposes of illustration, RD-Initiator and the RD-Responder are both using SDMA access technology. However, the delayed block acknowledgement system may utilize other transmission technologies such as SDMA, CDMA, TDMA, or OFDMA. For example, Table 1 illustrates different access technologies suitable for use by the RD-Initiator and the RD-Responder. However other transmission technologies not shown may be used.

TABLE 1

| Number | RD - Initiator | RD - Responder |
| --- | --- | --- |
| 1 | SDMA | SDMA |
| 2 | SDMA | OFDMA |
| 3 | SDMA | TDMA |
| 4 | TDMA | SDMA |
| 5 | TDMA | OFDMA |
| 6 | TDMA | TDMA |
| 7 | OFDMA | SDMA |
| 8 | OFDMA | OFDMA |
| 9 | OFDMA | TDMA |
| 10 | Multiple combinations of SDMA + OFDMA + TDMA | Multiple combinations of SDMA + OFDMA + TDMA |

Thus, the various aspects of the design described eliminate the need for an explicit BAR request from the transmitter thereby saving valuable system resources. For example, an explicit BAR could be 24-bytes of header with an additional overhead of PLCP Preamble+PLCP Signal Field+Service+Tail and Pad bits. In addition, the various aspects of the design help to ensure that the buffer levels at the transmitter are kept relatively low as compared to the existing Block ACK. Moreover, the various aspects of the design provide enough flexibility for the RD initiator for reassigning the spatial streams in the case of SDMA or more bandwidth in the case of OFDMA or both in the case of a combined SDMA+OFDMA scheme to other recipients of the RD Grant. Thus, increased transmission data rates and/or more robust transmissions may be achieved. In addition, spatial and frequency reuse may increase and be more efficient.

Any problem of increased jitter may be alleviated by not delaying the transmission of Block ACK beyond the TxOP duration. In this case, all the packets received during the TxOP duration or the RDG duration will have to be acknowledged before the end of that particular sequence of operations.

Figure 4:
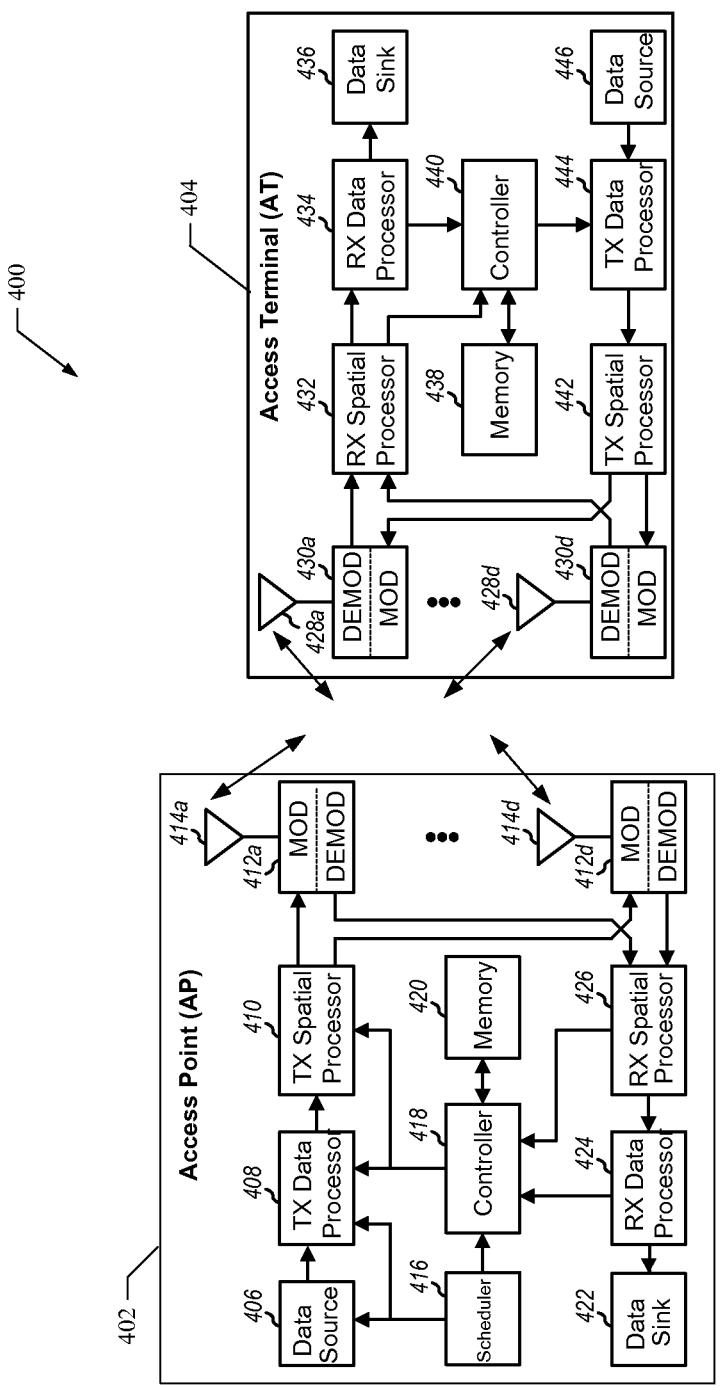
FIG. 4 shows a diagram illustrating aspects of an access point and access terminal that are configured to operate in accordance with aspects of a delayed block acknowledgment system.

FIG. 4 shows a diagram 400 illustrating aspects of an access point 402 and access terminal 404 that are configured to operate in accordance with aspects of a delayed block acknowledgment system. For example, the access point 402 is suitable for use as the access point 110a shown in FIG. 1, and the access terminal 404 is suitable for use as the terminal 120c also shown in FIG. 1.

Processing by the access point 402 and the terminal 404 for downlink and uplink communications is described in further detail below. In various aspects, the processing for the uplink may be the same, different, or complementary to the processing for the downlink.

With respect to downlink processing at access point 402, a transmit (TX) data processor 408 receives traffic data (i.e., information bits) from a data source 406 and signaling and other information from a controller 418 and possibly a scheduler 416.

The controller 418 is operable to access memory 420. These various types of data may be sent on different transport channels. The TX data processor 410 "frames" the data (if necessary), scrambles the framed/unframed data, encodes the scrambled data, interleaves (i.e., reorders) the coded data, and maps the interleaved data into modulation symbols. For simplicity, a "data symbol" refers to a modulation symbol for traffic data, and a "pilot symbol" refers to a modulation symbol for pilot. The scrambling randomizes the data bits. The encoding increases the reliability of the data transmission. The interleaving provides time, frequency, and/or spatial diversity for the code bits. The scrambling, coding, and modulation may be performed based on control signals provided by controller 418 and are described in further detail below. The TX data processor 408 provides a stream of modulation symbols for each spatial channel used for data transmission.

A TX spatial processor 410 receives one or more modulation symbol streams from TX data processor 408 and performs spatial processing on the modulation symbols to provide four streams of transmit symbols to modulators/demodulators 412a-d, one stream for each transmit antenna 414a-d. The spatial processing is described in further detail below. The TX data processor 408 and controller 418 can aggregate the data units and perform the layering necessary to accommodate the WLAN protocols. For example, the TX data processor 408 and controller 418 are operable to generate PPDUs as described above.

Each modulator/demodulator (MODEM) 422a-d receives and processes a respective transmit symbol stream to provide a corresponding stream of OFDM symbols. Each OFDM symbol stream is further processed to provide a corresponding downlink modulated signal. The four downlink modulated signals from the modulator/demodulator 412a through 412d are then transmitted from the four antennas 414a through 414d, respectively.

With respect to downlink processing at the terminal 404, one or multiple receiving antennas 428a-d receive the transmitted downlink modulated signals, and each receive antenna provides a received signal to a respective demodulator/modulator 430a-d. Each demodulator 430a-d performs processing complementary to that performed at modulator 412 and provides received symbols. A receive (RX) spatial processor 432 then performs spatial processing on the received symbols from all demodulators 430 to provide recovered symbols, which are estimates of the modulation symbols sent by the access point 402. The recovered symbols are provided to the RX data processor 434.

An RX data processor 434 receives and de-multiplexes the recovered symbols into their respective transport channels. The recovered symbols for each transport channel may be symbol de-mapped, de-interleaved, decoded, and descrambled to provide decoded data for that transport channel. The decoded data for each transport channel may include recovered packet data, messages, signaling, and so on, which are provided to a data sink 436 for storage and/or a controller 440 for further processing. The controller 440 is operable to access memory 438. The received data comprises the various PPDUs as described above.

Also with respect to the downlink, at each active user terminal, such as terminal 404, the RX spatial processor 432 further estimates the downlink to obtain channel state information (CSI). The CSI may include channel response estimates, received SNRs, and so on. The RX data processor 434 may also provide the status of each packet/frame that is received on the downlink. The controller 440 receives the channel state information and the packet/frame status and determines the feedback information to be sent back to the access point 402. The feedback information comprises the ACKs, BAs, and RDG Delayed Block ACK as described above.

With respect to the uplink processing at the terminal 404, the feedback information is processed by a TX data processor 444 and a TX spatial processor 442 (if present), conditioned by one or more modulators 440a-d, and transmitted via one or more antennas 428a-d back to the access point 402. Note that data may also be provided to the TX data processor from data source 446.

With respect to uplink processing at the access point 402, the transmitted uplink signal(s) are received by antennas 414a-d, demodulated by de-modulators 412a-d, and processed by an RX spatial processor 426 and an RX data processor 424 in a complementary manner to that performed at the user terminal 404. Information from the RX data processor is provided to a data sink 422. The feedback that is received comprises the ACKs, BAs, and RDG Delayed Block ACK as described above. The recovered feedback information is then provided to the controller 418 and the scheduler 416.

The scheduler 416 uses the feedback information to perform a number of functions such as (1) selecting a set of user terminals for data transmission on the downlink and uplink, (2) selecting the transmission rate(s) and the transmission mode for each selected user terminal, and (3) assigning the available FCH/RCH resources to the selected terminals. The scheduler 416 and/or controller 418 further use information (e.g., steering vectors) obtained from the uplink transmission for the processing of the downlink transmission.

In various aspects, a number of transmission modes are supported for data transmission on the downlink and uplink. For example, the access point 402 and terminal 404 are configured to provide transmission modes comprising space division, frequency division, time division, data rate division, and code division transmission modes.

Figure 5:
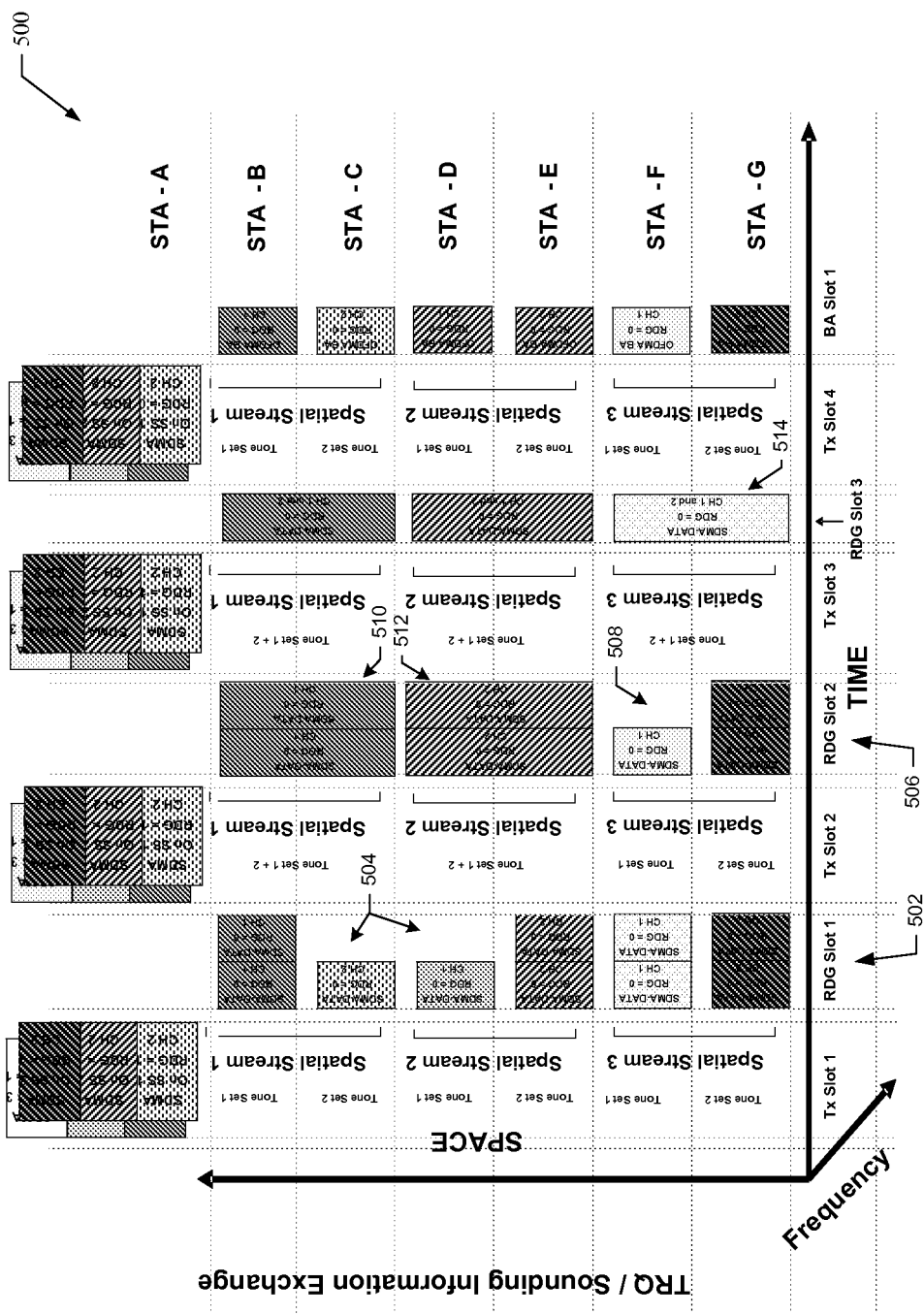
FIG. 5 shows a diagram illustrating transmission and reception exchanges utilizing various transmission technologies to provide a RDG Delayed Block ACK in accordance with aspects of a delayed block acknowledgement system.

FIG. 5 shows a diagram 500 illustrating transmission and reception exchanges utilizing various transmission technologies to provide a RDG Delayed Block ACK in accordance with aspects of a delayed block acknowledgement system. For example, the diagram 500 shows a sequence of packet exchange using an RDG Delayed BA with the RD-Initiator and RD-Responder using OFDMA+SDMA technologies. In an aspect, the RD-Initiator does frequency reuse when some of the stations indicate that they have no more data to send, which provides an additional advantage of the system.

Referring now to FIG. 5, after sending out data in "RDG slot 1" 502, the stations STA-C and STA-D indicate to the transmitter that they do not have anymore data to send, as shown at 504. The transmitting station STA-A reallocates the bandwidth (OFDMA Tone Set 2) to STA-B (see 510) and the (OFDMA Tone Set 1) to STA-E (see 512). Now due to this reallocation, STA-B and STA-E can transmit data at a higher transmission rate. Similarly in the "RDG Slot 2" 506, STA-F indicates that it has no more data to send back to STA-A, as indicated at 508. Hence in the next slot, STA-A allocates the Tone Set 1 to STA-G (see 514). In an aspect, based on the orthogonality, the spatial streams could also be reallocated to different users.

In various aspects, a number of transmission modes are supported for data transmission on the downlink and uplink. For example, the transmission modes comprise space division, frequency division, time division, data rate division, and code division transmission modes.

In an aspect, the system comprises a computer program product having one or more program instructions ("instructions") or sets of "codes" stored or embodied on a computer-readable medium, which are executable to provide the functions described herein. For example, the sets of codes may be loaded into an AT and/or AP from a computer-readable medium, such as a floppy disk, CDROM, memory card, FLASH memory device, RAM, ROM, or any other type of memory device or computer-readable medium. In another aspect, the sets of codes may be downloaded from an external device or network resource. The sets of codes, when executed by a computer, processor, CPU or other suitable device, operate to provide the various aspects described herein.

The teachings herein may be incorporated into (e.g., implemented within or performed by) a variety of wired or wireless apparatuses (e.g., nodes). In some aspects, a node implemented in accordance with the teachings herein may comprise an access point or an access terminal. In some aspects, the node is a wireless node. Such wireless node may provide, for example, connectivity for or to a network (e.g., a wide area network such as the Internet or a cellular network) via a wired or wireless communication link.

FIG. 6 shows an exemplary apparatus 600 for communication with one or more nodes for use in aspects of a delayed block acknowledgment system. For example, the apparatus 600 is suitable for use as the AP 402 shown in FIG. 4. In an aspect, the apparatus 600 is implemented by one or more modules configured to provide aspects of a delayed block acknowledgement system as described herein. For example, in an aspect, each module comprises hardware and/or hardware executing software.

The apparatus 600 comprises a first module comprising means (602) for transmitting to the one or more nodes a block comprising data and a first bit indicating no acknowledgements for the data are to be transmitted from the one or more nodes, and if a selected time location within a transmit time duration is reached, a second bit indicating that the one or more nodes are to transmit one or more acknowledgements, respectively, for the data. In an aspect, the means 602 comprises the Tx data processor 408. The apparatus 600 also comprises a second module comprising means (604) for determining whether the selected time location within the transmit time duration has been reached, which in an aspect comprises the controller 418. The apparatus 600 also comprises a third module comprising means (606) for receiving at least one acknowledgment for the data within a remaining portion of the transmit time duration, which in an aspect comprises the Rx data processor 424.

FIG. 7 shows exemplary apparatus 700 for communication for use in aspects of a delayed block acknowledgment system. For example, the apparatus 700 is suitable for use as the AP 404 shown in FIG. 4. In an aspect, the apparatus 700 is implemented by one or more modules configured to provide aspects of a delayed block acknowledgement system as described herein. For example, in an aspect, each module comprises hardware and/or hardware executing software.

The apparatus 700 comprises a first module comprising means (702) for receiving, from a node, a block comprising data and a first bit indicating no acknowledgement for the data is to be transmitted, and a second bit indicating an acknowledgement for the data is to be transmitted. In an aspect, the means 702 comprises the Rx data processor 434. The apparatus 700 also comprises a second module comprising means (704) for transmitting the acknowledgment for the data within a transmit time duration in response to receiving the second bit, which in an aspect comprises the Tx data processor 444.

Thus, the various illustrative logics, logical blocks, modules, and circuits described in connection with the aspects disclosed herein may be implemented or performed in an AT or AP with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed aspects is provided to enable any person skilled in the art to make or use the invention. Various modifications to these aspects may be readily apparent to those skilled in the art, and the generic principles defined herein may be applied to other aspects, e.g., in an instant messaging service or any general wireless data communication applications, without departing from the scope of the invention. Thus, the invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of a delayed block acknowledgment system for use in a wireless local area network have been illustrated and described herein, it will be appreciated that various changes can be made to the aspects without departing from their characteristics. Therefore, the disclosures and descriptions herein are intended to be illustrative, but not limiting, of the scope of the invention, which is set forth in the following claims.

What is claimed is:

1. A method for communication with a node, the method comprising:
    transmitting to the node a block comprising data and a first field indicating that no acknowledgements for the data are to be transmitted from the node and a grant for the node to transmit other data;
    receiving the other data from the node within the transmit time duration;
    determining whether a selected time location within the transmit time duration has been reached;
    transmitting to the node a second field, if the selected time location has been reached, wherein the second field indicates that the node is to transmit one or more acknowledgements for the data and an end of the grant; and
    receiving at least one acknowledgment for the data within the remaining portion of the transmit time duration.

2. The method of claim 1, further comprising negotiating for a delayed acknowledgment with the node.

3. The method of claim 1, further comprising transmitting to the node additional blocks comprising additional data and additional fields indicating no acknowledgements for the additional data are to be transmitted from the node.

4. The method of claim 1, further comprising transmitting a parameter indicating the remaining portion of the transmit time duration to the one or more nodes.

5. The method of claim 4, wherein the selected time location comprises a selected time location within the transmit time duration an end of a Reverse Direction Grant (RDG) period within the transmit time duration has been reached.

6. The method of claim 1, wherein the indication that the one or more nodes can transmit other data within the transmit time duration comprises a Reverse Direction Grant (RDG).

7. The method of claim 1, wherein the second field also indicates that the node can no longer transmit the other data within the transmit time duration.

8. The method of claim 7, further comprising transmitting a parameter indicating the remaining portion of the transmit time duration to the node.

9. A method for communication with one or more nodes, the method comprising:
    transmitting to the one or more nodes a block comprising data and a first field indicating that no acknowledgements for the data are to be transmitted from the one or more nodes and a grant for the one or more nodes to transmit other data;
    receiving the other data from the one or more nodes within the transmit time duration;
    determining that a selected acknowledgment is to be obtained from a selected node before a selected time location within the transmit time duration has been reached;
    transmitting a request for the selected acknowledgment to the selected node;
    determining whether the selected time location within the transmit time duration has been reached, the selected time location corresponding to an end of the grant;
    transmitting to the one or more nodes a second field, if the selected time location has been reached, wherein the second field indicates that the one or more nodes are to transmit one or more acknowledgements, respectively, for the data; and
    receiving at least one acknowledgment for the data within a remaining portion of the transmit time duration.

10. The method of claim 9, further comprising receiving the selected acknowledgement from the selected node within the transmit time duration in response to the acknowledgment request.

11. The method of claim 9, wherein the determination that the selected acknowledgment is to be obtained comprises determining that the selected acknowledgement is to be obtained based on resource utilization.

12. An apparatus for communication with a node, the apparatus comprising:
    a transmitter configured to transmit to the node, a block comprising data and a first field indicating that no acknowledgements for the data are to be transmitted from the node and a grant for the node to transmit other data;
    a controller configured to determine whether a selected time location within the transmit time duration has been reached;
    said transmitter further configured to transmit to the node a second field, if the selected time location has been reached, wherein the second field indicates that the node is to transmit one or more acknowledgements for the data and an end of the grant; and
    a receiver configured to receive the other data from the one or more nodes within the transmit time duration and at least one acknowledgment for the data within the remaining portion of the transmit time duration.

13. The apparatus of claim 12, wherein said controller is configured to negotiate for a delayed acknowledgment with the node.

14. The apparatus of claim 12, wherein said transmitter is configured to transmit to the node additional blocks comprising additional data and additional fields indicating no acknowledgements for the additional data are to be transmitted from the node.

15. An apparatus for communication with one or more nodes, the apparatus comprising:
    a transmitter configured to transmit to the one or more nodes, a block comprising data and a first field indicating that no acknowledgements for the data are to be transmitted from the one or more nodes and a grant for the one or more nodes to transmit other data;
    a controller configured to determine that a selected acknowledgment is to be obtained from a selected node before a selected time location within the transmit time duration has been reached and to determine whether the selected time location within the transmit time duration has been reached, the selected time location corresponding to an end of the grant;
    said transmitter further configured to transmit a request for the selected acknowledgment to the selected node and to transmit to the one or more nodes a second field, if the selected time location has been reached, wherein the second field indicates that the one or more nodes are to transmit one or more acknowledgements, respectively, for the data; and
    a receiver configured to receive the other data from the one or more nodes within the transmit time duration and at least one acknowledgment for the data within a remaining portion of the transmit time duration.

16. The apparatus of claim 15, wherein said receiver is configured to receive the selected acknowledgement from the selected node within the transmit time duration in response to the acknowledgment request.

17. The apparatus of claim 15, wherein said controller is configured to determine that the selected acknowledgment is to be obtained based on resource utilization.

18. An apparatus for communication with a node, the apparatus comprising:
  means for transmitting to the node:
    a block comprising data and a first field indicating that no acknowledgements for the data are to be transmitted from the node and a grant for the node to transmit other data, and
    if a selected time location within the transmit time duration is reached, a second field indicating that the node is to transmit one or more acknowledgements for the data and an end of the grant;
  means for determining whether the selected time location within the transmit time duration has been reached; and
  means for receiving the other data from the node within the transmit time duration and at least one acknowledgment for the data within the remaining portion of the transmit time duration.

19. The apparatus of claim 18, further comprising means for negotiating for a delayed acknowledgment with the node.

20. The apparatus of claim 18, wherein said means for transmitting operates to transmit the node additional blocks comprising additional data and additional fields indicating no acknowledgements for the additional data are to be transmitted from the node.

21. An apparatus for communication with one or more nodes, the apparatus comprising:
  means for transmitting to the one or more nodes:
    a block comprising data and a first field indicating that no acknowledgements for the data are to be transmitted from the one or more nodes and a grant for the one or more nodes to transmit other data,
    if a selected time location within the transmit time duration is reached, a second field indicating that the one or more nodes are to transmit one or more acknowledgements, respectively, for the data;
  means for determining whether the selected time location within the transmit time duration has been reached, the selected time location corresponding to an end of the grant;
  means for receiving the other data from the one or more nodes within the transmit time duration and at least one acknowledgment for the data within the remaining portion of the transmit time duration; and
  means for detecting that a selected acknowledgment is to be obtained from a selected node before the selected time location has been reached, wherein said means for transmitting operates to transmit an acknowledgment request to the selected node.

22. The apparatus of claim 21, wherein said means for receiving operates to receive the selected acknowledgement from the selected node within the transmit time duration in response to the acknowledgment request.

23. The apparatus of claim 21, wherein said means for detecting that the selected acknowledgment is to be obtained comprises means for detecting that the selected acknowledgement is to be obtained based on resource utilization.

24. A computer program product for communication with a node, the computer program product comprising:
  a non-transitory computer-readable medium encoded with codes executable to:
    transmit to the node a block comprising data and a first field indicating that no acknowledgements for the data are to be transmitted from the node and a grant for the node to transmit other data;
    receive the other data from the one or more nodes within the transmit time duration;
    determine whether a selected time location within the transmit time duration has been reached;
    transmit to the node a second field, if the selected time location has been reached, wherein the second field indicates that the node is to transmit one or more acknowledgements for the data and an end of the grant; and
    receive at least one acknowledgment for the data within the remaining portion of the transmit time duration.

25. An access point for communication with a node, the access point comprising:
  an antenna;
  a transmitter configured to transmit a block, via the antenna, to the node, wherein the block comprises data and a first field indicating that no acknowledgements for the data are to be transmitted from the node and a grant for the node to transmit other data;
  receive the other data from the node within the transmit time duration;
  a controller configured to determine whether a selected time location within the transmit time duration has been reached;
  said transmitter further configured to transmit to the node a second field, if the selected time location has been reached, wherein the second field indicates that the node is to transmit one or more acknowledgements for the data and an end of the grant; and
  a receiver configured to receive at least one acknowledgment for the data within the remaining portion of the transmit time duration.

26. A method for communication, the method comprising:
  receiving, at an apparatus from a node, a block comprising data and a first field indicating that no acknowledgement for the data is to be transmitted from the apparatus and a grant for the apparatus to transmit other data to the node;
  transmitting the other data to the node from the apparatus within the transmit time duration in response to receiving the first field;
  receiving a second field indicating that an acknowledgement for the data is to be transmitted and an end of the grant; and
  transmitting the acknowledgment for the data from the apparatus within the transmit time duration in response to receiving the second field.

27. The method of claim 26, further comprising negotiating for a delayed acknowledgment with the node.

28. The method of claim 26, further comprising receiving, at the node, additional blocks comprising additional data and additional fields indicating no acknowledgements for the additional data are to be transmitted.

29. The method of claim 26, further comprising:
  determining that an acknowledgment for selected data is to be transmitted before receiving the second field; and
  transmitting the acknowledgment for the selected data within the transmit time duration.

30. The method of claim 29, wherein said determination is based on at least one of resource utilization, data delay, and data jitter.

31. The method of claim 26, wherein the block further comprises a parameter indicating a remaining portion of the transmit time duration, and the other data is transmitted within the remaining portion of the transmit time duration.

32. The method of claim 26, wherein the indication that other data can be transmitted to the node within the transmit time duration comprises a Reverse Direction Grant (RDG).

33. The method of claim 26, wherein the second field also indicates that the other data can no longer be transmitted to the node within the transmit time duration, and the method further comprises ceasing transmitting the other data to the node in response to receiving the second field.

34. An apparatus for communication, the apparatus comprising:
a receiver configured to receive, from a node, a block comprising data and a first field indicating that no acknowledgement for the data is to be transmitted from the apparatus and a grant for the apparatus to transmit other data to the node, and to receive a second field indicating that an acknowledgement for the data is to be transmitted and an end of the grant; and
a transmitter configured to transmit the other data within the transmit time period in response to the first field and the acknowledgment for the data within the transmit time duration in response to receiving the second field.

35. The apparatus of claim 34, further comprising a controller configured to negotiate for a delayed acknowledgment with the node.

36. The apparatus of claim 34, wherein said receiver is configured to receive, from the node, additional blocks comprising additional data and additional fields indicating no acknowledgements for the additional data are to be transmitted.

37. The apparatus of claim 34, further comprising a controller configured to determine that an acknowledgment for selected data is to be transmitted before receiving the second field.

38. The apparatus of claim 37, wherein said transmitter is configured to transmit the acknowledgment for the selected data within the transmit time duration.

39. The apparatus of claim 37, wherein said controller is configured to determine that the acknowledgment for the selected data is to be transmitted based on at least one of resource utilization, data delay, and data jitter.

40. An apparatus for communication, the apparatus comprising:
means for receiving, from a node, a block comprising data and a first field indicating that no acknowledgement for the data is to be transmitted from the apparatus and a grant for the apparatus to transmit other data to the node, and a second field indicating that an acknowledgement for the data is to be transmitted and an end of the grant; and
means for transmitting the other data within the transmit time duration in response to receiving the first field and the acknowledgment for the data within the transmit time duration in response to receiving the second field.

41. The apparatus of claim 40, further comprising means for negotiating for a delayed acknowledgment with the node.

42. The apparatus of claim 40, wherein said means for receiving operates to receive, from the node, additional blocks comprising additional data and additional fields indicating no acknowledgements for the additional data are to be transmitted.

43. The apparatus of claim 40, further comprising:
means for determining that an acknowledgment for selected data is to be transmitted before receiving the second field, and wherein said means for transmitting operates to transmit the acknowledgment for the selected data within the transmit time duration.

44. The apparatus of claim 43, wherein said determination is based on at least one of resource utilization, data delay, and data jitter.

45. A computer program product for communication, the computer program product comprising:
a non-transitory computer-readable medium encoded with codes executable to:
receive from a node, a block comprising data and a first field indicating that no acknowledgement for the data is to be transmitted from the apparatus and a grant for the apparatus to transmit other data to the node;
transmit the other data to the node within the transmit time duration in response to receiving the first field;
receive a second field indicating that an acknowledgement for the data is to be transmitted and an end of the grant; and
transmit the acknowledgment for the data within the transmit time duration in response to receiving the second field.

46. An access terminal for communication, the access terminal comprising:
an antenna;
a receiver configured to receive from a node, via the antenna, a block comprising data and a first field indicating that no acknowledgement for the data is to be transmitted from the access terminal and a grant for the access terminal to transmit other data to the node, and to receive a second field indicating that an acknowledgement for the data is to be transmitted and an end of the grant; and
a transmitter configured to transmit the other data within the transmit time period in response to receiving the first field and the acknowledgment for the data within the transmit time duration in response to receiving the second field.

47. A method for communication with a node, the method comprising:
transmitting to the node a block comprising data and a first field indicating that no acknowledgements for the data are to be transmitted from the node and a Reverse Direction Grant (RDG) for the node to transmit other data;
receiving the other data from the node within a transmit time duration;
determining whether an end of a Reverse Direction Grant (RDG) period within the transmit time duration has been reached;
transmitting to the node a second field, if the end of the RDG period has been reached, wherein the second field indicates that the node is to transmit one or more acknowledgements for the data; and
receiving at least one acknowledgment for the data within a remaining portion of the transmit time duration.

48. The method of claim 47, wherein the second field indicates the end of the RDG period.

49. The method of claim 47, wherein the second field comprises a Reverse Direction Grant (RDG) field set to zero.

50. The method of claim 49, wherein the first field comprises a Reverse Direction Grant (RDG) field set to one.

* * * * *